United States Patent [19]
Long

[11] Patent Number: 5,534,665
[45] Date of Patent: Jul. 9, 1996

[54] WIRING HARNESS SHROUD

[75] Inventor: Charles F. Long, Pittsboro, Ind.

[73] Assignee: General Motors Corporation, Detroit, Mich.

[21] Appl. No.: 235,583

[22] Filed: Apr. 29, 1994

[51] Int. Cl.$^6$ .............................. H01B 17/00; F16L 3/00
[52] U.S. Cl. ..................... 174/72 A; 174/68.1; 24/17 B; 52/714; 248/68.1
[58] Field of Search ................................ 174/72 A, 71 R, 174/68.1, 68.3, 48, 70 C, 97, 95, 99 R, 101, 98; 248/68.1, 74.1, 74.2, 74.3, 74.4, 74.5, 75, 49; 211/60.1, 195; 52/220.1, 220.7, 698, 712, 714; D8/394; 24/17 B, 30.5 P, 30.5 S, 616; 59/78.1; 411/508, 509, 573, 514, 913

[56] References Cited

U.S. PATENT DOCUMENTS

| | | | |
|---|---|---|---|
| 800,052 | 9/1905 | Ayres | 248/74.1 X |
| 3,233,851 | 2/1966 | Lemieux et al. | 248/68.1 X |
| 3,733,655 | 5/1973 | Kolibar | 411/508 X |
| 3,756,115 | 9/1973 | Schuplin | 411/508 |
| 3,803,670 | 4/1974 | Johnson | 411/508 |
| 4,485,531 | 12/1984 | Murphy | 411/508 X |

FOREIGN PATENT DOCUMENTS 2242496  10/1991  United Kingdom ..................... 248/49

*Primary Examiner*—Hyung S. Sough
*Attorney, Agent, or Firm*—Donald F. Scherer

[57] ABSTRACT

A wiring harness shroud for use in a harsh environment to provide precise routing and protection for wire bundles. The wiring harness shroud comprises a U-channel having a base and two substantially parallel side walls within which one or more wire bundles may be received. The side walls have opposed and registered receiving slots within which a mounting member is demountably secured. The mounting member serves not only to secure the shroud but also to retain the wire bundles within the U-channel.

5 Claims, 3 Drawing Sheets

5,534,665

WIRING HARNESS SHROUD

TECHNICAL FIELD

The present invention relates generally to shrouds for electrical wiring harnesses. More particularly, the present invention relates to a shrouded wiring harness that is particularly well suited for use in the construction and repair of vehicles. Specifically, the present invention relates to a wiring harness shroud that can be manufactured economically and which can be installed with relative ease to provide precise routing of the wiring to accommodate preselected ingress and egress of the wires and which permits ready access to the wires, even when they are received within the shroud.

BACKGROUND OF THE INVENTION

The current state of the art relating to wiring harnesses utilizes several arrangements for routing and protecting wires within a vehicular environment.

One arrangement, which is quite typical in low volume applications, uses a plastic braid to provide abrasion protection for the wire and a steel shroud to route the wires within the environment. This method is currently used, for example, on the Allison WT transmission. This method tends to be very labor intensive and requires a special braiding machine to encapsulate the wires.

Another arrangement, which is typical in high volume applications, utilizes a plastic U-channel to provide both protection and precise routing in a single package. In order to retain the wires within the plastic U-channel, a series of tabs are molded into the channel. In order to locate the U-channel within the environment, a series of steel bolt bosses are also molded into the channel. This arrangement is currently provided by Packard Electric for use in conjunction with applicable automotive parts. The die to produce such a part is very complex and expensive. As a result, the complexity of the part does not lend itself to manufacturing with the higher temperature molding materials, such as Ultem, which is a registered trademark of General Electric. This approach proves economical only in the highest volume applications.

Another arrangement known to the prior art uses a duct with detachable fingers for retaining wires within the duct and for facilitating the addition of wires to the bundle. A duct cover may then be placed over the entire duct to retain all wires, especially if the duct is vertically mounted.

Another prior art wire routing arrangement uses an adjustable clip for retaining wires within a duct, the clip being easily attachable and detachable to the duct walls as well as being adjustable thereon.

Notwithstanding the usefulness of the known prior art arrangements, they do not provide a simple cost effective means for routing wires in a harsh environment, and particularly for low volume applications.

SUMMARY OF THE INVENTION

It is therefore a primary object of the present invention to provide a novel low cost solution to the wiring harness routing and protection problem.

It is another object of the present invention to provide a shroud for electrical wire harnesses, as above, that may be manufactured by simple low cost stamping and molding operations.

It is a further object of the present invention to provide a wire harness shroud, as above, which utilizes a mounting member not only to locate and secure the shroud in the surrounding environment, but also to serve as a wire retention device.

It is still another object of the present invention to provide a wire harness shroud, as above, that can be manufactured with simplified molds such that more complex multiple path shroud configurations become practical, allowing for additional applications of the U-channel approach to wiring protection along branched routings.

It is yet another object of the present invention to provide a low cost wire harness shroud, as above, that allows for easy and reliable assembly methods.

It is still a further object of the present invention to provide a wiring harness shroud, as above, that may be manufactured in various shaped standard size segments to reduce equipment and assembly costs even further.

These and other objects of the invention, as well as the advantages thereof over existing and prior art forms, which will be apparent in view of the following detailed specification, are accomplished by means hereinafter described and claimed.

In general, a wire harness shroud embodying the concepts of the present invention utilizes a U-channel having an elongate base with substantially parallel side walls extending from the base. The U-channel has a minimum of two ends. The side walls and the base form an opening to allow insertion of a wire bundle. The opposed side walls have at least one pair of registered receiving slots adapted to receive a mounting member that has a tang portion and a head portion.

A resilient spring lock extends outwardly from the tang portion. The spring lock has a blocking surface facing the head portion. The tang portion may be inserted into one of the receiving slots until the blocking surface abuts thereagainst, with the tang portion extending into the other of the registered slots so the wire bundle will be retained in the U-channel.

To acquaint persons skilled in the arts most closely related to the present invention, one preferred embodiment of a wire harness shroud that illustrates a best mode not contemplated for putting the invention into practice is described here by and with reference to the annexed drawings that form a part of the specification. The exemplary wiring harness shroud is described in detail without attempting to show all of the various forms and modifications in which the invention might be embodied. As such, the embodiment shown and described herein is illustrative, and as will become apparent to those skilled in these arts can be modified in numerous ways within the spirit and scope of the invention; the invention being measured by the appended claims and not by the details of the specification.

DESCRIPTION OF AN EXEMPLARY EMBODIMENT

Figure 1:
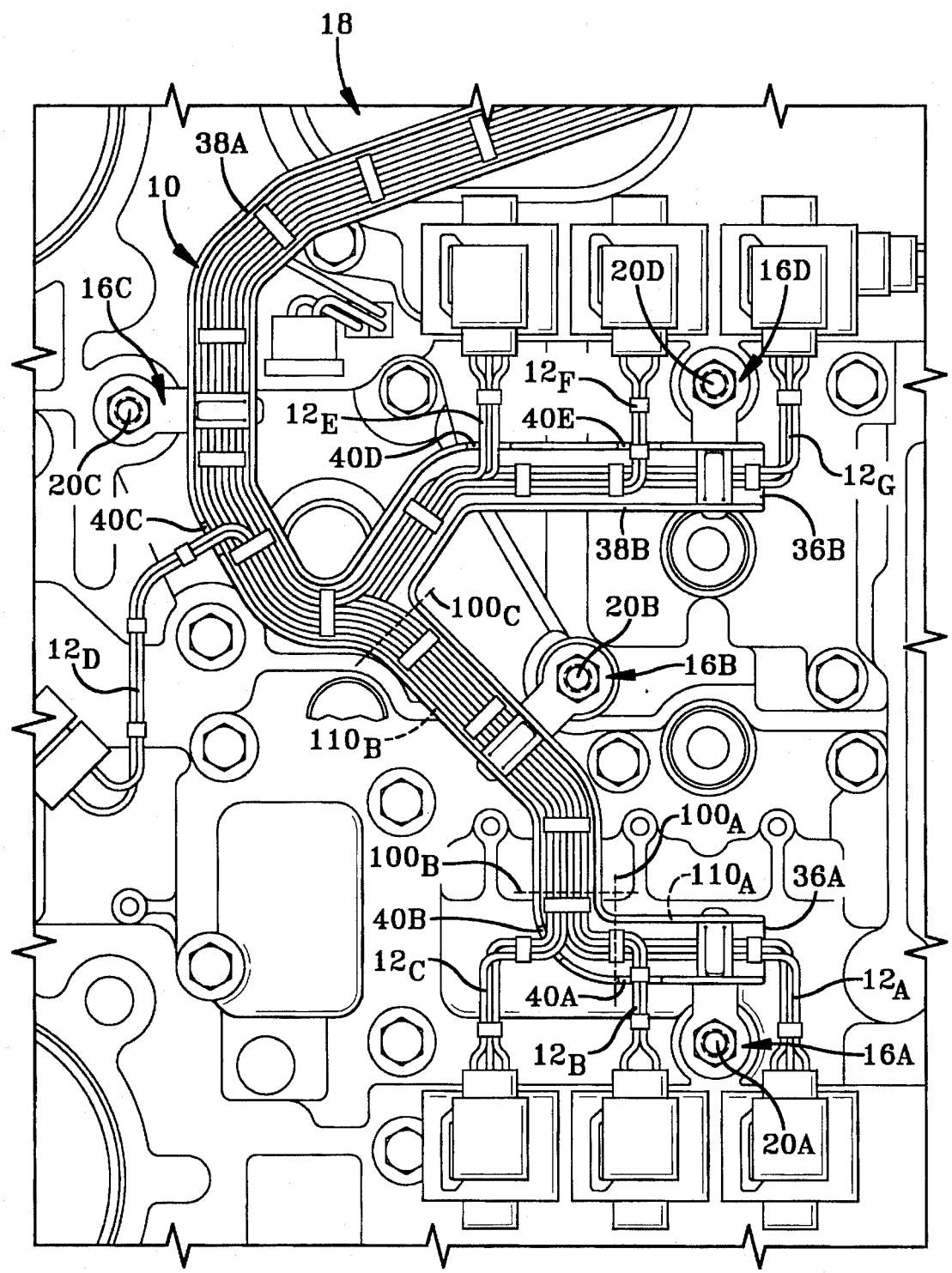
FIG. 1 is a diagrammatic top plan of a portion of a vehicular component, such as a transmission case or an engine, that depicts one or more wire harnesses received within a shroud embodying the concepts of the present invention.

One representative form of a wire harness shroud embodying the concepts of the present invention is designated generally by the numeral 10 on the accompanying drawings. With reference to FIG. 1, the representative wire harness shroud 10 provides a precise routing system for a plurality of wire bundles 12 to interconnect electrical, mechanical, optical or other similar type components. For purposes of this invention, the term wire bundle comprises a means for sending electrical mechanical, optical or other signals, with the wire bundle containing single or multiple wires. The shroud 10 protects the wire bundles $12_A$ through $12_G$ from abrasion and other harmful characteristics within its particular environment.

As previewed in the previous paragraph, and as will appear in the detailed description which follows, there will be situations where a similar, though not identical structural member, component or arrangement is employed at different locations. When referring generally to that type of structural member, component or arrangement, a common numerical designation shall also be employed, but in order to distinguish the nonidentical structural members, components or arrangements, a letter subscript shall be employed in combination with the numerical designation. Thus, there are in the representative embodiment depicted, seven wire bundles which are generally identified by the numeral 12, but the specific individual bundles which, while similar, are different from each Other. Those individual bundles shall therefore be identified, respectively, by the alphanumeric designation $12_A$ through $12_G$ in the specification and on the drawings. That convention shall also be employed throughout the specification.

As will appear in the detailed description which follows, there are also virtually identical structural members, components or arrangements that may be employed at more than one location. When referring generally to that type of structural member, component or arrangement, a common numerical designation shall be employed. However, when one of the structural members, components or arrangements so identified is to be individually identified, it shall be referenced by virtue of a letter suffix employed in combination with the numerical designation employed for general identification of that structural member, component or arrangement. Thus, there are at least two hereinafter described receiving slots which are generally identified by the numeral 34, but the specific individual receiving slots are, respectively, identified as 34A, 34B, etc. in the specification and on the drawings. This suffix convention shall also be employed throughout the specification.

Figure 2:
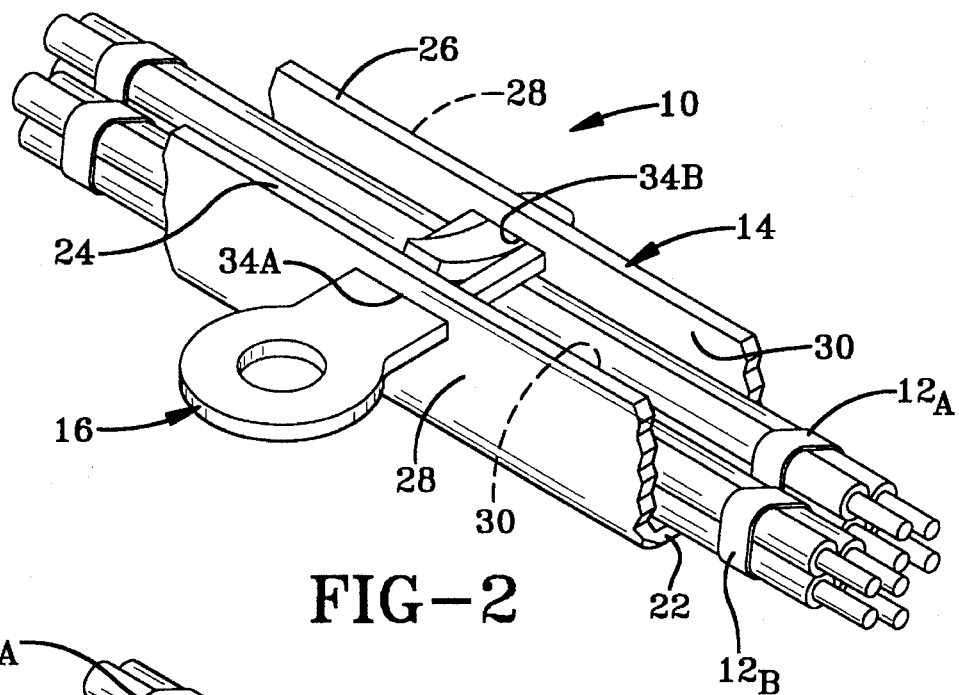
FIG. 2 is an enlarged perspective depicting a portion of the shroud represented in FIG. 1 with a portion of the wiring harness extending through the shroud and with a mounting member cooperatively interacting with the shroud to retain the wiring harness within the shroud.
Figure 3:
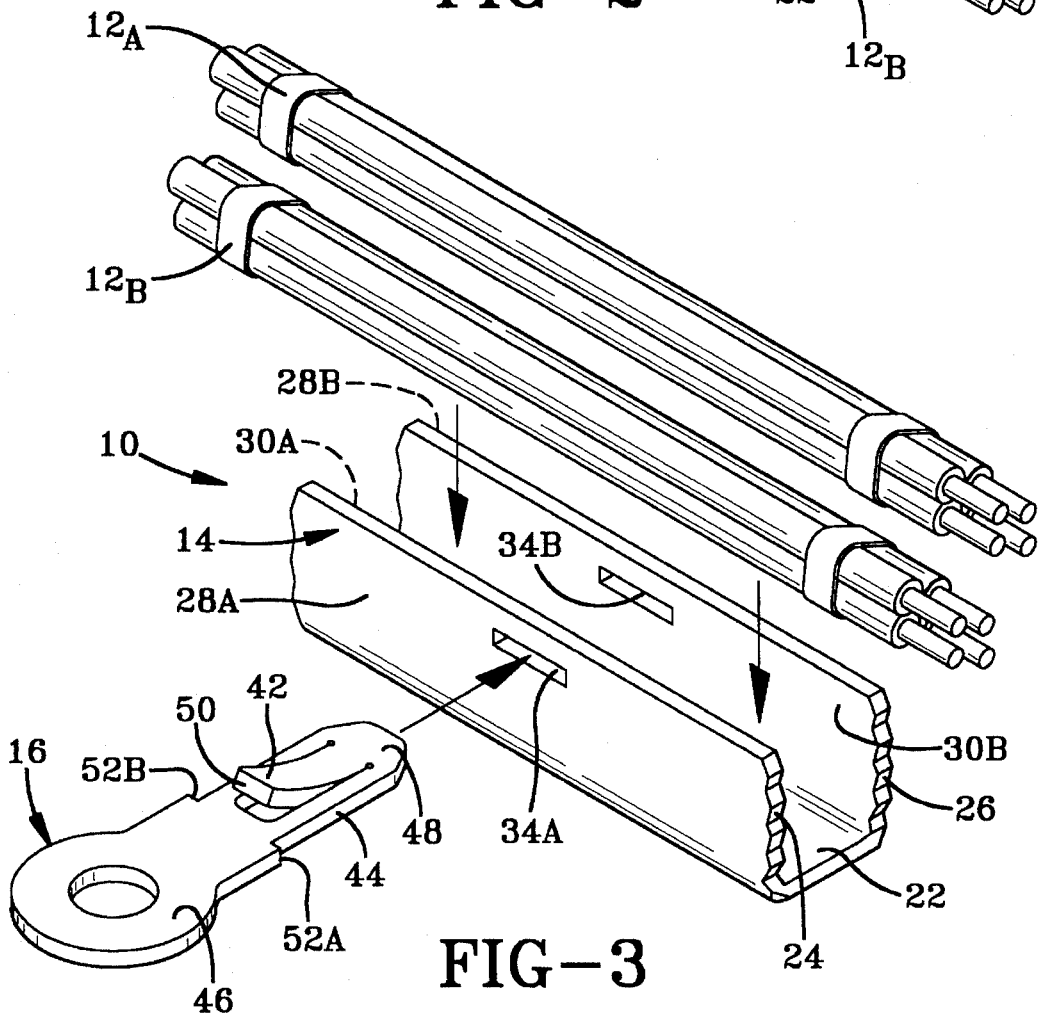
FIG. 3 is an exploded perspective of the assembly depicted in FIG. 2.

As best seen in FIGS. 2 and 3, the shroud 10 utilizes a U-channel 14 for receiving and routing the wire bundle 12 as desired. A mounting member 16 may be inserted through the U-channel 14 to retain the wire bundle within the U-channel as illustrated in FIGS. 1 and 2, the mounting member 16 may then be used to secure the shroud 10 to a device, such as an engine or transmission case 18. Hardware for fastening the mounting member 16 and the shroud 10 to the transmission case 18 or other device, may be a machine bolt 20, as shown.

Figure 4:
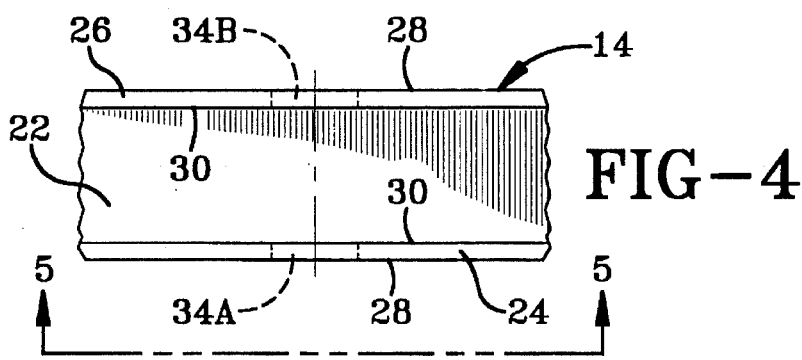
FIG. 4 is a top plan of reduced size of a portion of the shroud depicted in FIGS. 1–3.
Figure 5:
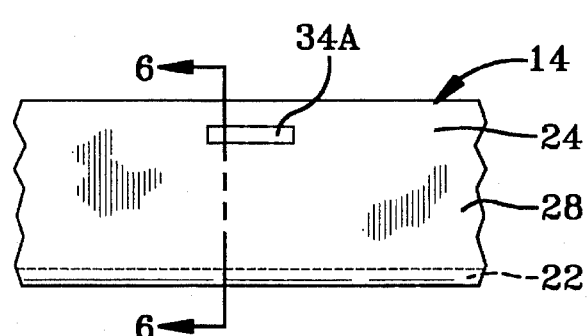
FIG. 5 is a frontal elevation taken substantially along line 5—5 of FIG. 4.
Figure 6:
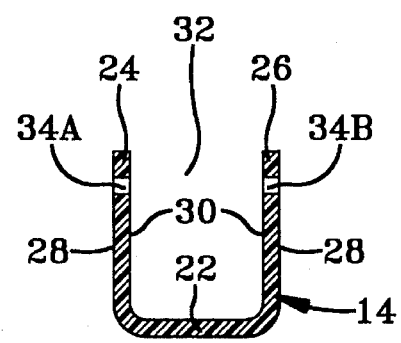
FIG. 6 is a vertical section taken substantially along line 6—6 of FIG. 5.

As represented in FIGS. 4 through 6, the U-channel 14 has an elongate base 22 and two substantially parallel side walls 24 and 26 that extend generally perpendicularly from the base 22. Each side wall 24 and 26 has an exteriorly facing surface 28 and an interiorly facing surface 30. The base 22 and the side walls 24 and 26 form an opening 32 through which the wire bundles 12 may be positioned in the U-channel 14. With continued reference to FIGS. 4 through 6, the opposed side walls 24 and 26 present registered rectangular receiving slots 34A and 34B, respectively, that are preferably substantially parallel with the base 22. The receiving slots 34 will generally be positioned near the top of the opposed side walls 24 and 26, but they may be located wherever required.

The U-channel 14 will have a minimum of two ends, but will more likely have a plurality of ends 36 (FIG. 1) that may extend from a plurality of branches 38, as is also best illustrated in FIG. 1. Additionally, the U-channel 14 may be made up of any combination of standard segments that are commonly used in various applications and specialized segments that are shaped to meet specific requirements. For example, as shown in FIG. 1, a reference line $100_A$ may delineate one end of an independent linear segment $110_A$ which extends from the end 36A to the reference line $100_A$. A second independent but dog-leg segment $110_B$ may extend from reference line $100_B$ to reference line $100_C$. The reference lines $100_A$ and $100_B$ need not be juxtaposed, but this demonstrates that the shroud arrangement may be a single multi-branched unit represented by the shroud 10 depicted in FIG. 1, or the shroud can be made up of a plurality of individual segments 110 that may abut each other or be intermittently placed throughout the environment.

A further feature of the U-channel 14, as illustrated in FIG. 1, is that it may be configured or modified so that one or more notches 40—the five 40A through 40E, as depicted, are integrally molded within or cut from one or both side walls 24 and 26. These notches 40 will allow some or all of the wires in any of the wire bundles 12 to exit through either of the side walls 24 or 26 of the U-channel 14 to effect a desired connection.

The U-channel 14 may be made of any material, but making the U-channel 14 from a polymeric material provides an arrangement that is well adapted for use in harsh engine compartment environments.

Figure 7:
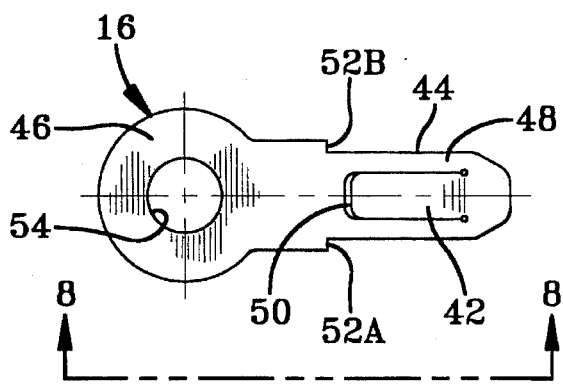
FIG. 7 is a top plan of reduced size of the mounting/retention member depicted in FIGS. 1–3.
Figure 8:
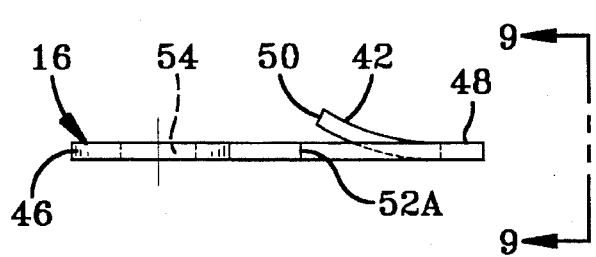
FIG. 8 is a side elevation taken substantially along line 8—8 of FIG. 7.
Figure 9:
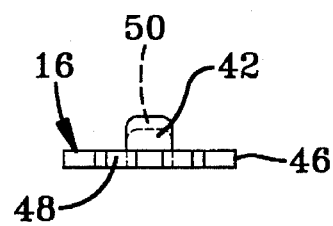
FIG. 9 is an end elevation taken substantially along line 9—9 of FIG. 8.

As shown in FIG. 3, after a wire bundle 12 is placed in the U-channel 14, the mounting member 16 is inserted into the registered receiving slots 34 and secured within the U-channel by a resilient spring lock 42 that is well adapted to being integral with the mounting member 16. Specifically, and as shown in FIGS. 7–9, the tang portion 44 of the mounting member 16 extends outwardly from a head portion 46. A resilient spring lock 42 is outwardly offset from one surface 48 of the tang portion 44. The spring lock 42 presents a blocking surface 50 which faces the head portion 46.

As illustrated in FIG. 3, the tang portion 44 of the mounting member 16 is insertably receivable within one of the registered receiving slots 34 presented from the opposed side walls 24 and 26 of the U-channel 14. For example, therefore, tang portion 44 of the mounting member 16 may be inserted in slot 34A from exteriorly of the U-channel 14. The effort required to insert the tang portion 44 into the slot 34A depresses the spring lock 42 into substantially coplanar relation with the tang portion 44 of the mounting member 16, allowing the tang portion 44 to pass through the first slot 34A.

Once the spring lock 42 passes through the slot 34A, the spring lock 42 will return to its original disposition. So disposed, the blocking surface 50 will engage the interiorly directed surface 30A of the side wall 24. The engagement of the spring lock 42 with side wall 24 will thereby secure the mounting member 16 within slot 34A. In order more firmly to secure the mounting member 16 to the U-channel 14, a pair of shoulders 52A and 52B may delineate the transition between the tang portion 44 and the head portion 46. When the blocking surface 50 on the spring lock 42 engages the interiorly facing surface 30A on side wall 24, the transition shoulders 52 may preferably engage the exteriorly facing surface 28A on side wall 24. When fully inserted, the tang portion 44 of the mounting member 16 will also be received in slot 34B in the opposing side wall 26, which serves to secure the mounting member 16 even more firmly to the U-channel 14. Therefore, when the mounting member 16 is secured to the U-channel 14, it will retain the wire bundles 12 within the U-channel 14 and thereby prevent damage to the wire bundles 12 from the surrounding environment.

The mounting member 16 may be made of any material, but is preferably made of steel. The head portion 46 is preferably provided with a bore 54 to receive a machine bolt 20 by which the mounting member 16, and thus the shroud 10, may be secured to, for example, the case 18 of a transmission. A plurality of registered pairs of slots 34 may be placed anywhere along the length of the U-channel 14 so that the mounting member 16 insertably received therein can be conveniently mounted to the transmission case 18.

While only a preferred embodiment of the present invention is disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

As should now be apparent, the present invention not only teaches that a wiring harness shroud embodying the concepts of the present invention is capable of precisely routing, protecting and securing the wiring harness shroud to a device, but also that the other objects of the invention can be likewise accomplished.

The embodiments of the invention in which an exclusive property or privilege is claimed are defined as follows:

1. A wiring harness shroud comprising:

a U-channel having an elongate base with substantially parallel side walls extending substantially perpendicularly from said base;

each said side wall having one or more receiving slots;

said receiving slots in said opposed side walls being registered;

said U-channel having a minimum of two end openings;

a mounting member having a tang portion and a head portion;

a resilient, spring lock presented from said tang portion;

said spring lock having a blocking surface facing said head portion;

said tang portion being demountably received within said receiving slots until said blocking surface abuts one said side wall, with the tang portion extending into the registered slot in the other side wall;

said head portion has a bore therethrough so that a fastening means may be received within said bore to secure said mounting member in a desired location.

2. A wiring harness shroud, as set forth in claim 1, wherein:

at least one shoulder on said head portion is disposed in opposition to said blocking surface so that when said tang portion is inserted into one of said registered slots, said shoulder and said blocking surface will sandwich the side wall through which said tang portion extends between said blocking surface and said shoulder.

3. A wiring harness shroud, as set forth in claim 2, wherein:

at least one of said side walls is provided with a plurality of notches for routing wires to a desired location laterally of said U-channel.

4. A wiring harness shroud, as set forth in claim 3, wherein the U-channel comprises:

segments of predetermined lengths.

5. A wiring harness shroud, as set forth in claim 4, wherein:

said U-channel is disposed along a predetermined path to route the wires as desired within the environment.

* * * * *